US009299028B2

(12) United States Patent
Gupta et al.

(10) Patent No.: US 9,299,028 B2
(45) Date of Patent: Mar. 29, 2016

(54) IDENTIFYING SUGGESTIVE INTENT IN SOCIAL POSTS

(71) Applicant: Adobe Systems Incorporated, San Jose, CA (US)

(72) Inventors: Vineet Gupta, Kanpur (IN); Devesh Varshney, Roorkee (IN); Harsh Jhamtani, Kanpur (IN); Deepam Kedia, Ahmedabad (IN); Shweta M. Karwa, Jaina (IN)

(73) Assignee: Adobe Systems Incorporated, San Jose, CA (US)

( * ) Notice: Subject to any disclaimer, the term of this patent is extended or adjusted under 35 U.S.C. 154(b) by 242 days.

(21) Appl. No.: 14/071,442

(22) Filed: Nov. 4, 2013

(65) Prior Publication Data

US 2015/0127591 A1    May 7, 2015

(51) Int. Cl.
*G06F 15/18* (2006.01)
*G06N 5/04* (2006.01)
*G06N 99/00* (2010.01)

(52) U.S. Cl.
CPC ............... *G06N 5/04* (2013.01); *G06N 99/005* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 8,171,021 B2 * | 5/2012 | Guha | ................ | G06F 17/30864 707/723 |
| 8,306,972 B2 * | 11/2012 | Gupta | ............... | G06F 17/30867 707/724 |
| 8,631,003 B2 * | 1/2014 | Guha | ................ | G06F 17/30864 707/723 |
| 8,826,453 B2 * | 9/2014 | Arrelid | ................... | H04L 63/10 709/219 |
| 8,918,421 B2 * | 12/2014 | McCormack | .......... | G06Q 30/01 707/770 |
| 9,146,116 B1 * | 9/2015 | Champaneria | ....... | G06Q 10/025 |
| 9,183,311 B2 * | 11/2015 | Gupta | ............... | G06F 17/30867 |
| 2015/0106304 A1 * | 4/2015 | Gupta | ..................... | G06N 5/04 706/11 |
| 2015/0127591 A1 * | 5/2015 | Gupta | .................. | G06N 99/005 706/12 |

OTHER PUBLICATIONS

Topic-specific post identification in microblog streams Karunasekera, S.; Harwood, A.; Samarawickrama, S.; Ramamohanarao, K.; Robins, G. Big Data (Big Data), 2014 IEEE International Conference on Year: 2014 pp. 7-13, DOI: 10.1109/BigData.2014.7004416 IEEE Conference Publications.*

(Continued)

*Primary Examiner* — Michael B Holmes
(74) *Attorney, Agent, or Firm* — Wolfe-SBMC

(57) ABSTRACT

This document describes techniques for identifying suggestive intent in social posts. In one or more implementations, a topic is received and social posts to one or more social networks that are related to the topic are collected. Then, one or more suggestive intent posts expressing suggestions towards the topic are identified from the collected social posts. In one or more implementations, a set of related topics are received and social posts to one or more social networks that correspond to the related topics are collected. Then, aspects corresponding to the related topics are identified, and a sentiment score is generated for each aspect of each related topic that can be used to compare aspects of the related topics. In one or more implementations a suggestive intent model, usable to identify social posts expressing suggestive intent, is built from a training corpus of annotated social posts.

20 Claims, 9 Drawing Sheets

(56) References Cited

OTHER PUBLICATIONS

Social Mood Extraction from Twitter Posts with Document Topic Model Ohmura, M.; Kakusho, K.; Okadome, T. Information Science and Applications (ICISA), 2014 International Conference on Year: 2014 pp. 1-4, DOI: 10.1109/ICISA.2014.6847465 IEEE Conference Publications.*

An emotional feedback system based on a regulation process model for happiness improvement Yu-Heng Hung; Yang-Yen Ou; Ta-Wen Kuan; Chin-Hui Cheng; Jhing-Fa Wang; Jaw-Shyang Wu Orange Technologies (ICOT), 2014 IEEE International Conference pp. 205-208, DOI: 10.1109/ICOT.2014.6956635 IEEE Conference Publication.*

Discovering User Preference from Folksonomy Xiaohui Guo; Richong Zhang; Jinpeng Huai; Hailong Sun; Xudong Liu Systems, Man, and Cybernetics (SMC), 2013 IEEE International Conference on Year: 2013 pp. 2114-2119, DOI: 10.1109/SMC.2013.362 IEEE Conference Publications.*

* cited by examiner

IDENTIFYING SUGGESTIVE INTENT IN SOCIAL POSTS

BACKGROUND

There are a vast number of social conversations occurring on social networks at any given time. Many of these conversations include user opinions or suggestions regarding products. For example, a user might post on Facebook® "I wish the screen on my phone was bigger", or "the touch screen on my laptop needs to be more responsive". These user suggestions can enable business to improve their products and to identify market opportunities.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This document describes techniques for identifying suggestive intent in social posts. In one or more implementations, a topic is received and social posts to one or more social networks that are related to the topic are collected. Then, one or more suggestive intent posts expressing a suggestion towards the topic are identified from the collected social posts. In some cases, aspects related to the topic towards which the suggestions are targeted are also identified.

In one or more implementations, a set of related topics are received and social posts to one or more social networks that correspond to the related topics are collected. Then, aspects corresponding to the related topics are identified, and a sentiment score is generated for each aspect of each related topic. A user interface can be displayed that compares the sentiment scores for each aspect for each of the related topics.

In one or more implementations a suggestive intent model, usable to identify social posts expressing suggestive intent, is built from a training corpus of annotated social posts.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

This document describes techniques for identifying suggestive intent in social posts. In one or more implementations, a topic (e.g., a product) is received and social posts to one or more social networks that are related to the topic are collected. Then, one or more suggestive intent posts expressing a suggestion (e.g., a recommendation or a complaint) towards the topic are identified from the collected social posts. In some cases, aspects (e.g., features) related to the topic towards which the suggestions are targeted are also identified.

In one or more implementations, a set of related topics are received and social posts to one or more social networks that correspond to the related topics are collected. Then, aspects corresponding to the related topics are identified, and a sentiment score is generated for each aspect of each related topic. A user interface can be displayed that compares the sentiment scores for each aspect for each of the related topics.

In one or more implementations a suggestive intent model, usable to identify social posts expressing suggestive intent, is built from a training corpus of annotated social posts.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
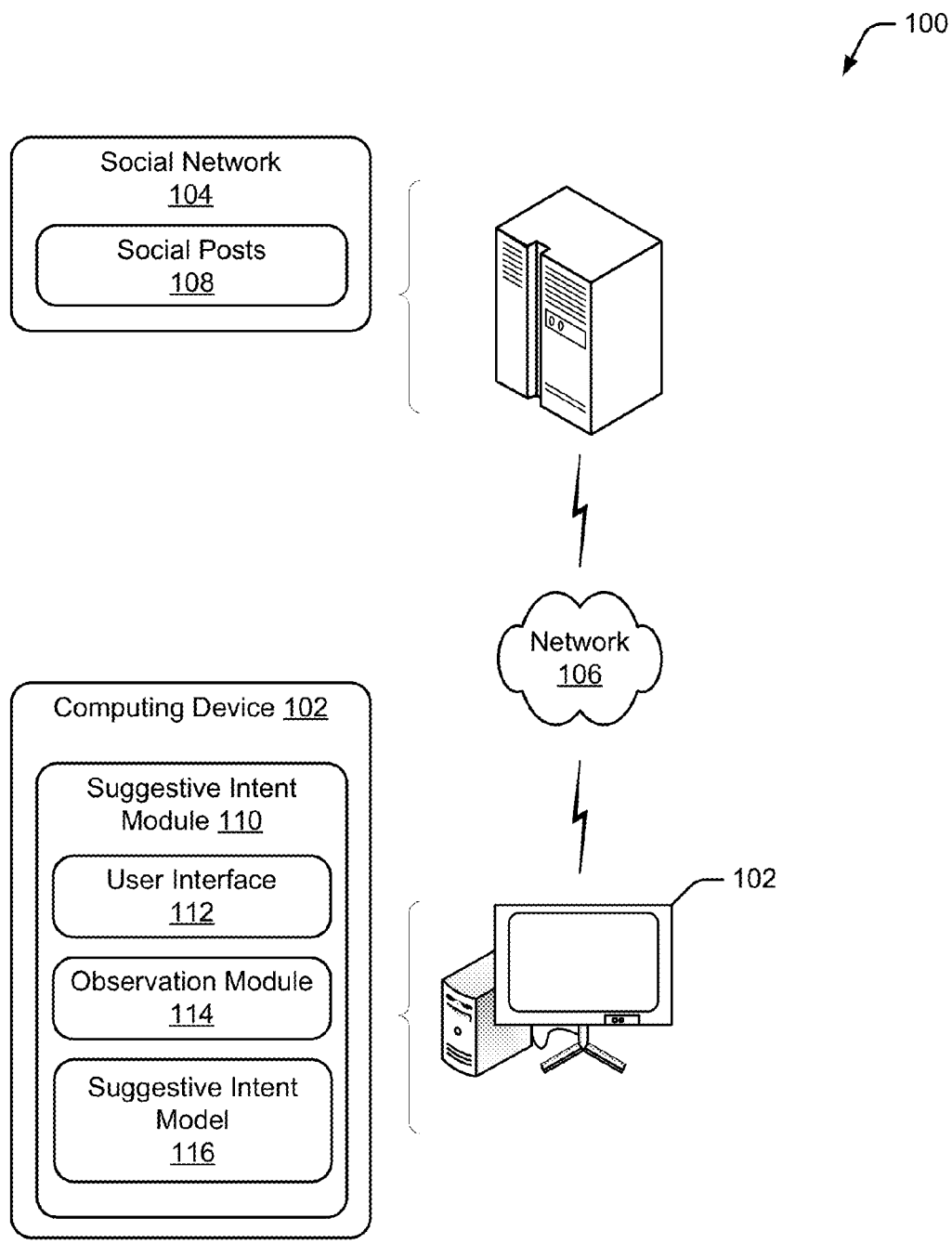
FIG. 1 illustrates an environment in an example implementation that is operable to employ techniques described herein.

FIG. 1 illustrates an environment 100 in an example implementation that is operable to employ techniques described herein. Environment 100 includes a computing device 102 and a social network 104 that are communicatively coupled via a network 106. Computing device 102 and social network 104 may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to low-resource devices with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 9.

Although network 106 is illustrated as the Internet, the network may assume a wide variety of configurations. For example, network 106 may include a wide area network (WAN), a local area network (LAN), a wireless network, a public telephone network, an intranet, and so on. Further, although a single network 106 is shown, network 106 may also be configured to include multiple networks.

Social network 104 provides an interface (not shown) for multiple users to interact with a social network community over network 106. As described herein, a social network may include blogs and online forums, social media sharing services, social networking services, and social news services. Social media sharing services can include video services (e.g., YouTube® and Vimeo®), photo services (e.g., Flickr®, Picasa®, and Instagram®), audio services (e.g., Pandora® and LastFM®), and bookmark services (e.g., StumbleUpon® and Delicious®). Example of social networking services include Facebook®, Google+®, Twitter®, LinkedIn®, Plurk®, and Xing®. Examples of social news services include Digg® and Reddit®.

Social network 104 enables users to submit social posts 108 to the social network. As described herein, social posts 108 include any message published to an online forum or newsgroup, a social network platform (e.g., Facebook®, Twitter®, or Instagram®), a blog, or any other type of social network 104. In some cases, social posts 108 may also include responses, comments, or replies to an original social post 108 by users of the social network community. In one or more embodiments, social posts 108 may also include reviews of products posted to online stores.

Computing device 102 is illustrated as including a suggestive intent module 110 which is configured to identify social posts 108 that express suggestive intent towards a given topic. Suggestive intent module 110 includes a user interface 112, an observation module 114, and a suggestive intent model 116. User interface 112 is configured to receive user input that identifies a topic. As described herein, a topic can include any category of goods or services that can be purchased or consumed by users, such as travel, food, phones, or cars, to name just a few. A topic can also be directed to specific brands or items, such as iPhone®, Toyota® Camry, Nike®, or Red Robin®.

Observation module 114 monitors one or more social networks 104 to collect social posts 108 that are related to the identified topic. Suggestive intent module 110 then provides the identified topic and the collected social posts to suggestive intent model 116. Suggestive intent model 116 is configured to identify, from the collected social posts, one or more social posts 108 that express a suggestion towards the identified topic. Suggestive intent model 116 is also configured to identify one or more aspects, in the social posts, towards which the suggestions are targeted.

As described herein, suggestions may include a suggestion or recommendation to improve a particular aspect of a topic. In some cases, suggestions may be expressed as a wish or hope. For example, a user may post "I wish the screen on my phone was bigger", which is a suggestion to increase the size of the screen of the user's phone. Suggestions may also include complaints towards a particular aspect of a topic. For example, a user may post "I can't watch movies on my phone because the screen is way too small", which is also a suggestion to increase the size of the phone's screen.

As described herein, aspects may include features of the topic. For example, aspects related to the topic "phone" may include words such as "screen", "speakerphone", "size", "design", "battery life", "camera", and "volume". As another example, aspects related to the topic "car" may include such words or phrases as "speed", "acceleration", "fuel economy", "stereo system", "cruise control", and "navigation".

Social posts 108 that express suggestions towards a given topic will be referred to as suggestive intent posts, and social posts 108 that do not express suggestive intent towards the given topic will be referred to as non-suggestive intent posts.

The suggestive intent posts can be identified by identifying features indicative of suggestive intent in the social posts. For example, various words or phrases, such as "wish" or "hope", indicate that a social post includes a suggestion. The way in which these features are determined is described below in section titled "Building the Suggestive Intent Model". Suggestive intent module 110, therefore, can identify a social post as a suggestive intent post by determining that the social post includes a given topic, and by determining that the social post includes features indicative of suggestive intent that are targeted to an aspect related to the given topic.

Figure 9:
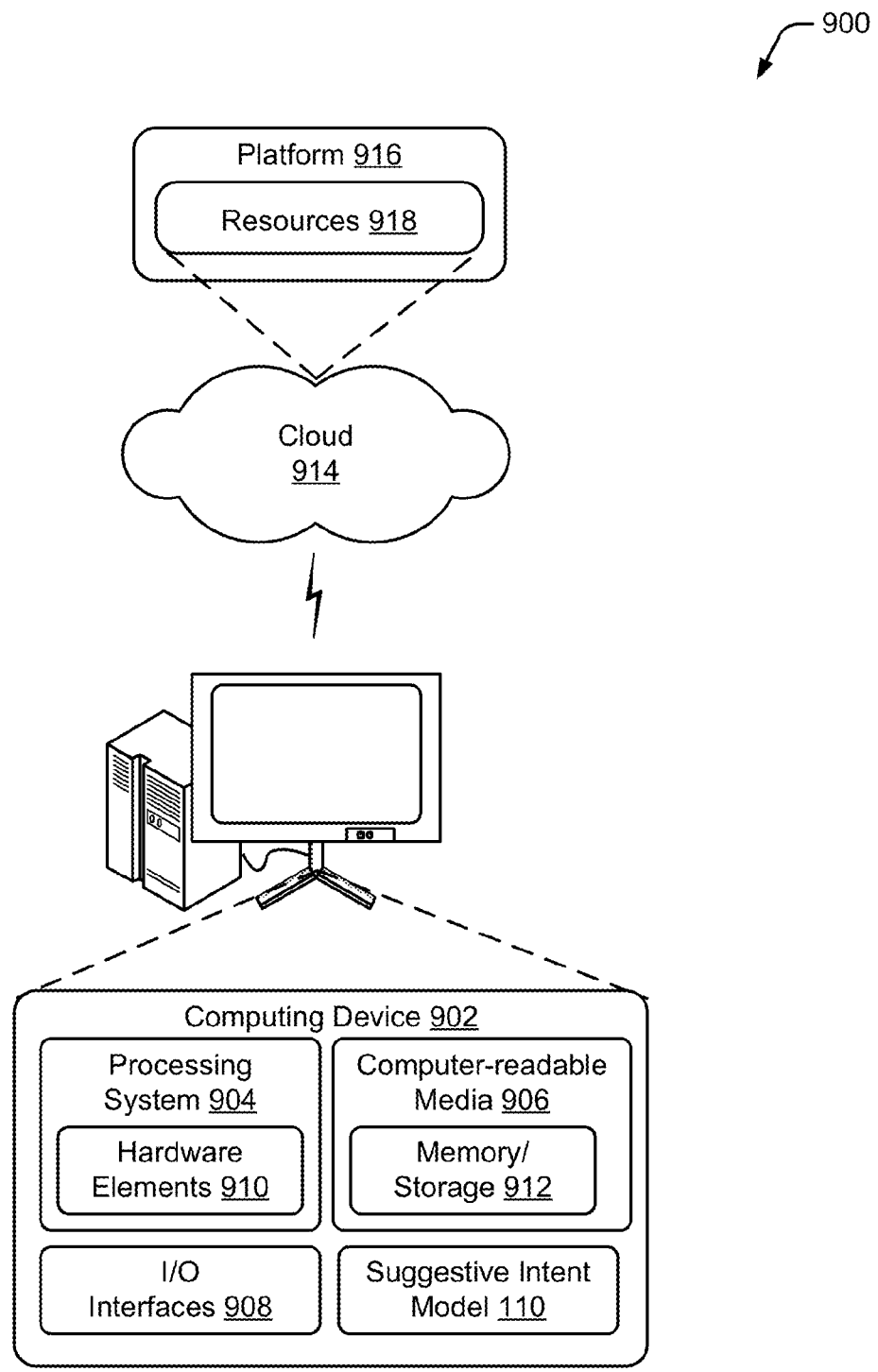
FIG. 9 illustrates an example system including various components of an example device that can be implemented as any type of computing device as described and/or utilized with reference to FIGS. 1-8 to implement embodiments of the techniques described herein.

Although illustrated as part of computing device 102, functionality represented by suggestive intent module 110 may be further divided, such as to be performed "over the cloud" by one or more servers that are accessible via network 106, further discussion of which may be found in relation to FIG. 9.

Identifying Suggestions in Social Posts

Figure 2:
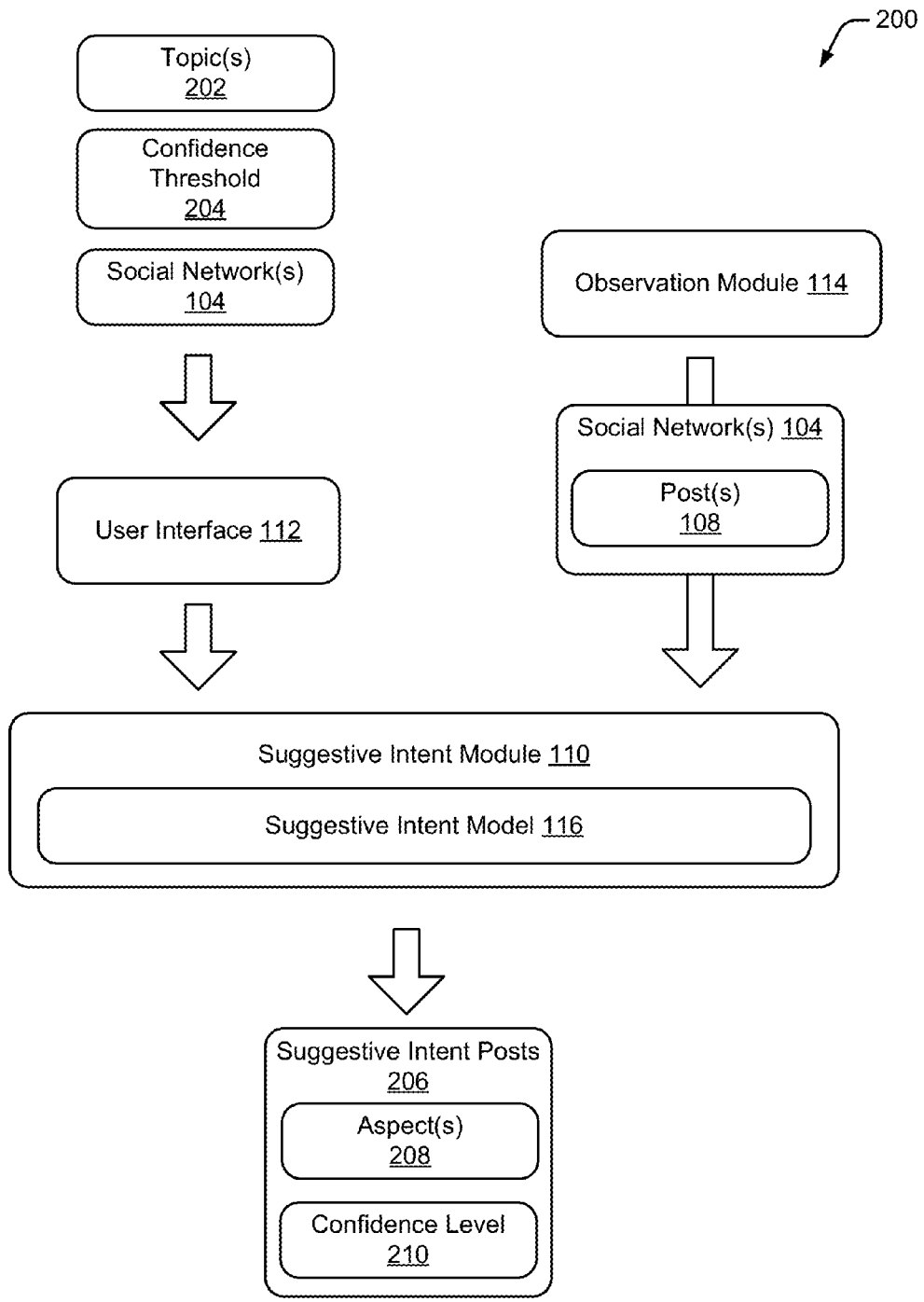
FIG. 2 illustrates a system in an example implementation in which a suggestive intent model is used to identify social posts expressing suggestive intent towards a given topic.

FIG. 2 illustrates a system 200 in an example implementation in which suggestive intent model 116 is used to identify suggestive intent posts that express suggestions towards a given topic and to identify aspects towards which the suggestions are targeted.

In this example, user input that identifies a topic 202, a confidence threshold 204, and one or more social networks 104 is received via user interface 112. In one or more embodiments, confidence threshold 204 can be selected to be between 1 and 100, and enables the user to specify the level of confidence required for a social post 108 to be classified as a suggestive intent post by suggestive intent model 116.

Figure 3:
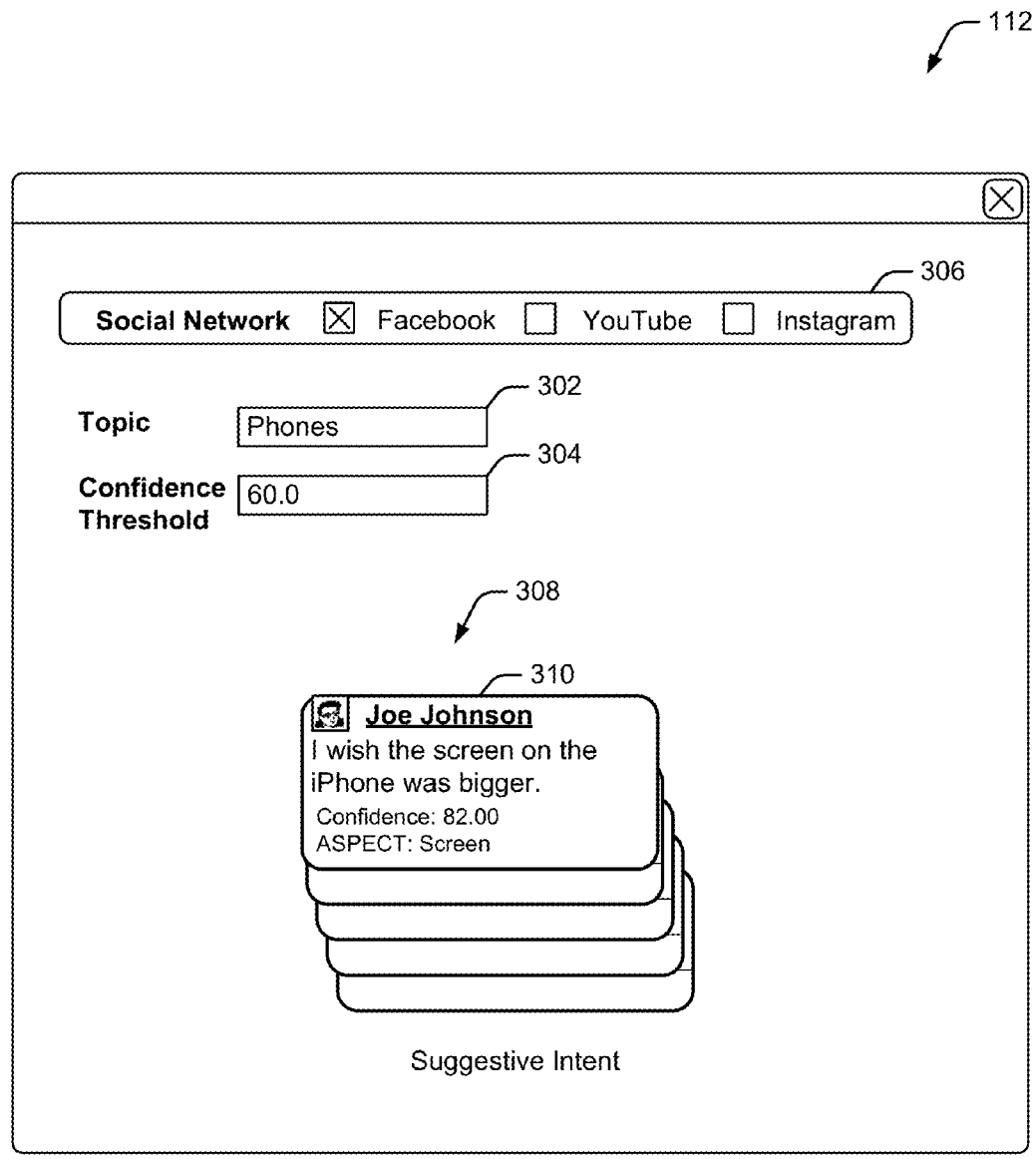
FIG. 3 illustrates an example user interface in accordance with one or more implementations.

As an example, consider FIG. 3 which illustrates an example of user interface 112. In this example, user interface 112 includes a topic control 302 that enables a user to identify a particular topic, a confidence threshold control 304 which enables the user to specify the confidence threshold, and a social network control 306 which enables the user to select which social networks are to be monitored. In FIG. 3, the user has input the topic "Phones" into topic control 302, has input a confidence threshold of "60.0" into confidence threshold control 304, and has selected Facebook® from social network control 306. Note that user interface 112 enables the user to monitor a single social network 104, or multiple different social networks 104 (such as both Facebook® and Twitter®).

Returning to FIG. 2, social posts 108 to social network 104 that are related to topic 202 are collected by observation module 114. For example, observation module 114 can scan the text of social posts 108 to find social posts that include topic 202. Observation module 114 is configured to identify specific types of topic 202 in social posts 108. For example, if "phones" is input as topic 202, observation module 114 can identify specific types or brands of phones, such as "iPhone", "Nokia Lumia", or "Samsung Galaxy". Observation module 114 can be configured to collect, in real time, social posts 108 that are currently being posted to social network 104 and/or social posts 108 that were previously posted to social network 104.

Suggestive intent module 110 passes topic 202, confidence threshold 204, and the collected social posts 108 that are related to topic 202 to suggestive intent model 116. Suggestive intent model 116 identifies, from the collected social posts 108, one or more suggestive intent posts 206 that express a suggestion towards topic 202. Suggestive intent model 116 can also identify, in the suggestive intent posts

206, one or more aspects 208 of topic 202 towards which the one or more suggestions are targeted.

In order to determine whether a social post 108 should be classified as a suggestive intent post 206, suggestive intent model 116 can identify and extract various features indicative of suggestive intent from collected social posts 108. Features indicative of suggestive intent include aspects 208 related to topic 202, implicit aspects 208 related to topic 202, wish or hope words or phrases, opinion words or phrases, negative opinion words or phrases, comparative words or phrases, sentiment words or phrases, and/or "bag-of-words" based delta-term frequency-inverse document frequency (TF-IDF) vectors. The way in which suggestive intent model is built to determine the features indicative of suggestive intent is described in more detail below, in the section entitled "Building the Suggestive intent Model".

Aspects 208 related to topic 202 are indicative of suggestive intent because if a post includes topic 202 and an aspect 208 related to topic 202, it is likely that the social post expresses a suggestion towards the aspect. For example, aspects related to the topic "phone" may include words such as "screen", "speakerphone", "size", "design", "battery life", "camera", and "volume". Thus, suggestive intent model 116 may identify a social post as expressing a suggestion towards a particular aspect of a particular phone if the social post includes the particular phone and the particular aspect related to the particular phone.

In some cases, aspects 208 may be implicit. Consider, for example, the social post "nothing could be heard on the phone". This social post may be directed to the aspect "speakerphone", and is a suggestion to improve the speakers on the phone. In this case, therefore, suggestive intent model 116 can identify the aspect "speakerphone" even though the term speakerphone is not used in the social post.

Wish or hope words or phrases are indicative of suggestive intent because users often express suggestions in the form of wishes or hopes. For example, a user may post "I wish the screen on my phone was bigger", which is a suggestion to make the screen on the phone bigger.

Opinion words or phrases are indicative of suggestive intent because users often express suggestions in the form of an opinion. For example, a user may post "the screen on my phone is not big enough to watch videos", which is a suggestion to make the screen on the phone bigger. Users may also express suggestions in using negative opinion words or phrases. For example, a user may post "the screen on my phone is very poor", which is a suggestion to improve the screen on the phone.

Comparative words or phrases are indicative of suggestive intent because users often express suggestions by comparing one topic to a related topic. For example, a user may post "the Nokia Lumia has a much better screen than the iPhone", which is a suggestion to improve the screen of the iPhone.

Sentiment words or phrases are indicative of suggestive intent because suggestions often include a negative sentiment words or phrase such as "very poor" or positive sentiment words or phrases such as "really good".

In some implementations, in order to determine whether a social post 108 should be classified as a suggestive intent post 206, suggestive intent model 116 computes a confidence level 210 for each of the collected social posts 108 based on the identified features indicative of suggestive intent. For example, if a social post 108 includes the identified topic 202, an aspect 208 related to the identified topic, and an opinion word or phrase, suggestive intent model 116 may generate a high confidence level 210 for the social post. In some cases, the confidence level is computed to be between 1 and 100, where a confidence level of 100 indicates that suggestive intent model 116 is 100% confident that the social post is a suggestive intent post 206.

In one or more embodiments, suggestive intent model 116 determines whether each social post 108 is classified as a suggestive intent post 206 based on a comparison of confidence level 210 to confidence threshold 204. If confidence level 210 of a social post 108 is greater than or equal to confidence threshold 204, then the social post will be classified as a suggestive intent post 206.

After identifying suggestive intent posts 206 from the collected social posts 108 directed to topic 202, suggestive intent module 110 can cause display of representations of suggestive intent posts 206 in user interface 112. Suggestive intent module 110 can identify and cause display of the representations of suggestive intent posts 206 in real-time as the social posts 108 are being posted to the one or more social networks 104.

As an example, consider again, FIG. 3. In this example, user interface 112 displays representations of suggestive intent posts 308. Each of suggestive intent posts 308 express a suggestion regarding the selected topic 202 of "Phones". User interface 112 enables the user to select a representation of one of suggestive intent posts 308 to view additional information about the selected post. In FIG. 3, for example, a user has selected a representation of a suggestive intent post 310 from suggestive intent posts 308. Responsively, user interface 112 displays information about the selected post, which in this example includes an identifier of the user of selected suggestive intent post 310 ("Joe Johnson"), the text of the selected suggestive intent post 310 ("I wish the screen on the iPhone was bigger"), the confidence level of the selected suggestive intent post 310 ("82.00"), and the aspect towards which the suggestion is directed, which in this case is "screen".

As an iPhone is a type of phone, suggestive intent post 310 has also been classified as corresponding to the selected topic of phones by suggestive intent model 116. In addition, suggestive intent post 310 includes features that are indicative of suggestive intent, which causes suggestive intent model 116 to compute a confidence level of "82.00" for suggestive intent post 310. For example, suggestive intent post 310 includes a topic related to phones ("iPhone"), an aspect related to the identified topic ("screen"), and the wish phrase "I wish". Note that suggestive intent post 310 is classified as a suggestive intent post 308 because the confidence level of 82.00 is greater than the confidence threshold of 60.00 set by the user.

Figure 4:
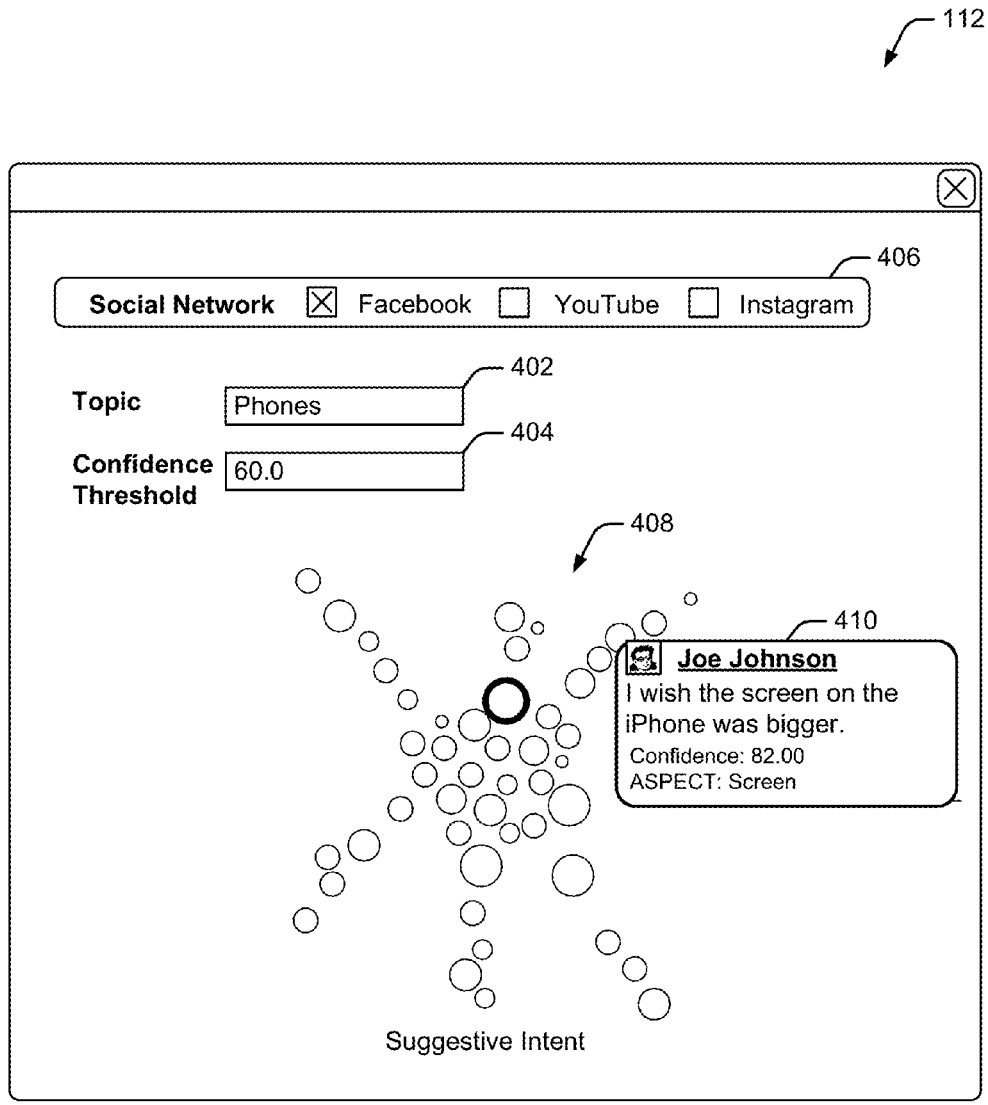
FIG. 4 illustrates an additional example user interface in accordance with one or more implementations.

As another example of user interface 112, consider FIG. 4. Similar to FIG. 3, user interface 112 in FIG. 4 includes a topic control 402 that enables a user to identify a particular topic, a confidence threshold control 404 which enables the user to specify the confidence threshold, and a social network control 406 which enables the user to select which social networks are to be monitored. Unlike user interface 112 in FIG. 3, however, in FIG. 4 user interface 112 displays representations of suggestive intent posts 408 in the form of dots. Each individual dot represents a particular social post 108 that a user has made to social network 104.

In one or more embodiments, a size of the dot of suggestive intent posts 408 represents the confidence level of the particular post expressing suggestive intent. For example, the larger the dot of a selected post, the higher the confidence level of the selected post. In one or more embodiments, the dots may be formatted or colored based on the corresponding aspect of the social posts. For example, posts directed to the aspect "speakerphone" may be colored blue, whereas posts directed to the aspect "screen" may be colored green.

In one or more embodiments, a user can hover over each dot to see additional information pertaining to the particular social post 108. In FIG. 4, for example, a user has hovered over a representation of suggestive intent post 410, and in response, user interface 112 displays additional information about suggestive intent post 410. In this example, the additional information includes an identifier of the user of selected suggestive intent post 410 ("Joe Johnson"), the text of the selected suggestive intent post 410 ("I wish the screen on the iPhone was bigger"), the confidence level of the selected suggestive intent post 410 ("82.00"), and the aspect towards which the suggestion is directed, which in this case is "screen".

In one or more embodiments, suggestive intent model 116 is configured to sort suggestive intent posts 206 based on the confidence level 210 associated with each post. In this way, suggestive intent model 116 may provide the user with the social posts which suggestive intent model is most confident express suggestions towards a given topic. Consider, for example, that if thousands of social posts are identified that indicate suggestive intent towards a given topic, that businesses may prefer to see the posts which suggestive intent model 116 is most confident corresponds to suggestive intent towards the given topic.

In one or more embodiments, suggestive intent module 110 can be configured to summarize social posts 108 posted in the form of user reviews on a review website, such as user reviews of a product on "Amazon®". Suggestive intent module 110 can be configured to identify aspects of the product in each user review, and summarize the user reviews based on each aspect. Thus, when a user goes to the review website, instead of having to read each review, the reviews can be summarized to make it easier for the user to determine whether or not to purchase the product.

Comparing Aspects of Related Topics

In various embodiments, suggestive intent model 116 is configured to identify and compare aspects of related topics. For example, given the topic of phones, suggestive intent model 116 can compare aspects of two or more different types of phones. The related topics may correspond to the same company (e.g., Apple iPhone5 and Apple iPhone4), or the related topics may correspond to different companies (e.g., Apple iPhone versus Samsung Galaxy).

Suggestive intent model 116 is configured to identify aspects in suggestive intent posts 206 corresponding to two or more related topics, as described above. Then, suggestive intent model 116 generates a sentiment score for each aspect for each of the two or more related topics.

To generate the sentiment score, suggestive intent model 116 computes a sentiment score for each individual social post. The sentiment score may be based on words in the social posts 108 that are indicative of positive sentiment or words in the social posts 108 that are indicative of negative sentiment. In one or more embodiments, the sentiment score for each word is between −1.0 and 1.0, where a score of −1.0 corresponds to 100% negative sentiment towards the aspect, and a score of 1.0 corresponds to 100% positive sentiment towards the aspect. Suggestive intent model 116 then calculates the sentiment score for a particular aspect of a particular topic as the sum of the individual sentiment scores for each of the social posts 108 corresponding to the particular aspect of the particular topic. For example, if there are five social posts related to a first phone and the aspect "screen", with sentiment scores of 0.5, 0.7, 0.6, 0.75, and 0.9, the total sentiment score for the first phone and the screen aspect would be 3.45. In some cases, the sentiment score can be normalized by dividing the total sentiment score for a particular aspect of a particular topic by the total number of social posts that correspond to the particular aspect of the particular topic.

Figure 5:
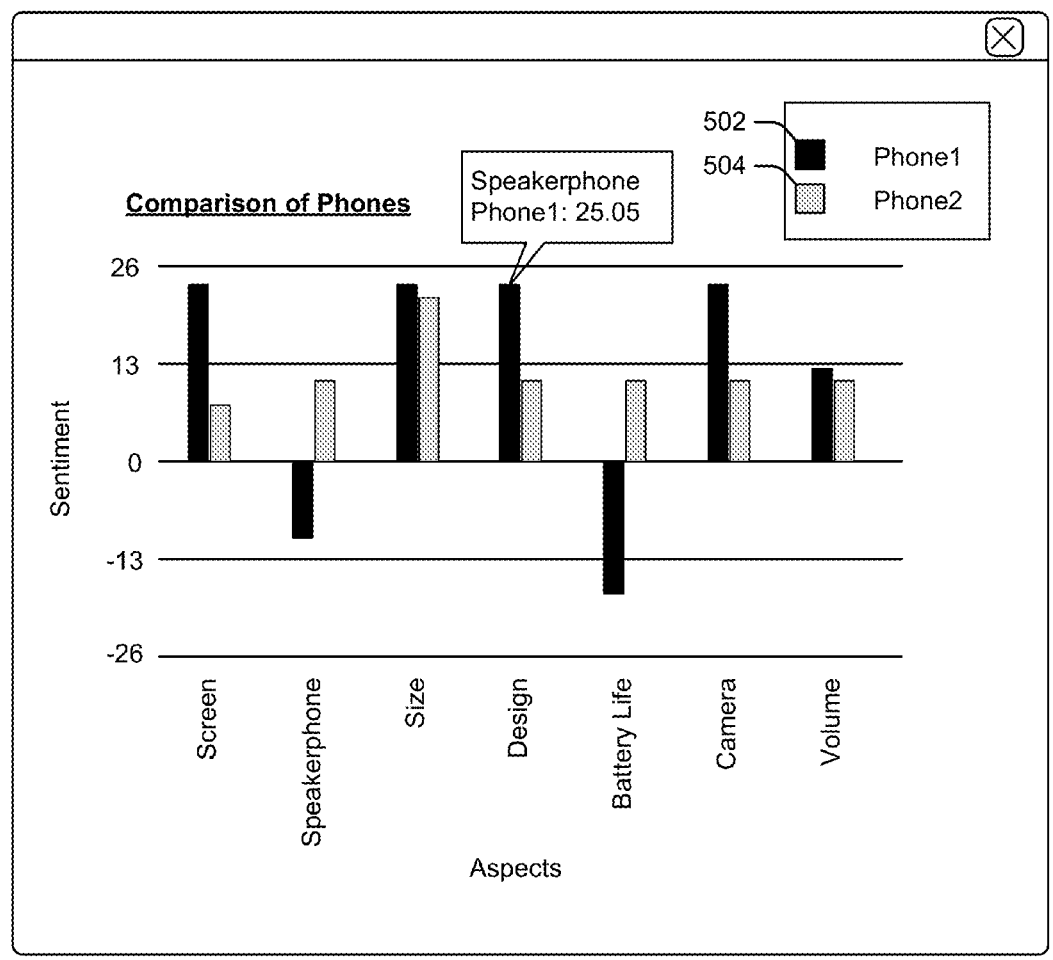
FIG. 5 illustrates an additional example user interface in accordance with one or more implementations.

Consider, for example, FIG. 5 which illustrates user interface 112 that displays a comparison between two related topics. In this example, user interface 112 displays a comparison of aspects for a first phone 502 and a second phone 504. The aspects, in this example, include screen, speakerphone, size, design, battery life, camera and volume.

User interface 112 displays a representation of a sentiment score for first phone 502 and second phone 504 for each aspect. In this example, the representation of the sentiment score is a bar chart, where first phone 502 is indicated by a black box and second phone 504 is indicated by a gray box. It is to be appreciated, however, that any type of representation of the sentiment score can be used. Other types of representations of the sentiment score, for example, may include a line graph or a plot of dots, where dots representing each social post are plotted on the chart for each aspect.

This comparison provides competitive intelligence to a business by enabling the business to compare aspects of related topics. For example, a business that produces first phone 502 can determine, from user interface 112, that first phone 502 has a higher sentiment score than second phone 504 for screen, size, design, camera, and volume, but a lower sentiment score for speakerphone and battery life. This comparison between related topics also enables a business to identify market opportunities by identifying aspects where competitors have low sentiment scores.

In one or more embodiments, suggestive intent model 110 can be used to provide a fuzzy filter for e-commerce applications. Conventional filters for e-commerce applications are based on the physical characteristic of a product, such as an "8-12 megapixel camera". Suggestive intent model 110, however, can determine sentiment scores associated with aspects of a product, and use this information to enrich the filters based on the experiences of previous users and their suggestions. For example, if a sentiment score is provided in terms of 1-5 stars, suggestive intent model 110 could provide a filter such as, "select all phones with greater than a 3-star camera rating".

Building the Suggestive Intent Model

In order to build suggestive intent model 116, a "training corpus" can be generated by annotating multiple social posts 108 that were previously posted to social network 104 to indicate whether the social post expresses suggestive intent or does not express suggestive intent.

The training corpus can then be analyzed to determine the various features of social posts 108 that are indicative of suggestive intent. To do so, the text of the training corpus is linguistically parsed to locate features indicative of suggestive intent. Any standard machinery can be used for the linguistic parsing of the text. As described above, the features indicative of suggestive intent may include wish or hope words or phrases, opinion words or phrases, negative opinion words or phrases, comparative words or phrases, sentiment words or phrases.

In some cases, the features indicative of purchase intent may also include "bag-of-words" based delta-TF-IDF vectors. To calculate the delta-TF-IDF vectors, suggestive intent posts and non-suggestive intent posts are separated from the annotated social posts. Then, for each word occurring in these two sets of data, a higher delta-TF-IDF score is given to words that occur in a suggestive intent post and a lower delta-TF-IDF score is given to words that occur in a non-suggestive intent post. The delta-TF-IDF vector score is computed using the following formula:

$$V_{t,p} = n_{t,p} * \log_2\left(\frac{N_t}{P_t}\right)$$

In this formula, $n_{t,p}$ corresponds to the frequency count of a term t in a post p, $P_t$ corresponds to the number of posts of the annotated suggestive intent posts with the term t, and $N_t$ corresponds to the number of posts of the annotated non-suggestive intent posts with the term t. Thus, suggestive intent model 116 can be more confident that a social post 108 corresponds to a suggestive intent post if the social post includes words with high delta-TF-IDF vector scores.

Suggestive intent model 116 also determines objects that are dependent on the extracted opinion phrases or comparative words. These objects become candidate aspects. To determine whether an aspect corresponds to a particular topic, a distance of the topic from the aspect may be determined. Consider the example statement, "I wish the screen on my phone was smaller". Here, suggestive intent model 116 identifies that the topic is phone, and the aspect is screen, and measures the distance of the word "screen" from the word "phone". In this example, suggestive intent model 116 determines that the aspect corresponds to the topic. Alternately, consider the example statement "I don't like eating food while watching my television." Here, food is a candidate aspect, but the distance between food and television is large, and thus suggestive intent model 116 does not identify food as an aspect for television.

In one or more embodiments, in order to determine the distance of an aspect from a topic, the following equation can be used:

$$MI(x, y) = \log\left(\frac{2 * p(x, y)}{p(x) + p(y)}\right)$$

In this equation, the variable x corresponds to an aspect, and y corresponds to a topic. The variable $p(x)$ corresponds to the probability of the aspect x occurring individually in a social post, the variable $p(y)$ corresponds to the probability of the topic y occurring individually in a social post, and the variable $p(x,y)$ corresponds to the probability of the aspect x and the topic y occurring together in a social post.

The training corpus can also be analyzed to determine suggestive intent words and non-suggestive intent words. To do so, the training corpus is parsed to locate verbs and nouns. The located verbs and nouns can then be scored based on how many times the located verbs and nouns occur in annotated social posts expressing suggestive intent, versus how many times the located verbs and nouns occur in annotated social posts not expressing express suggestive intent. For instance, if a particular verb occurs often in social posts that express suggestive intent, this particular verb will be assigned a high score to indicate that the verb indicates suggestive intent.

In some implementations, the following equation is used to score each word:

$$\text{Score}(w) = \frac{n(w^+)}{N_+} \log \frac{N_-}{n(w^-)}$$

In this equation, the variable "w" corresponds to a word (e.g., a verb or noun) extracted from social posts of the training corpus. The variable "$w^+$" corresponds to the number of times that this word appears in social posts of the training corpus that express suggestive intent, and the variable "$w^-$" corresponds to the number of times that this word appears in social posts of the training corpus that do not express suggestive intent. The variable "$N^+$" corresponds to the total number of social posts in the training corpus that express suggestive intent, and "$N^-$" corresponds to the total number of social posts in the training corpus that do not express suggestive intent.

The scored verbs and nouns are then selected to be either suggestive intent words or non-suggestive intent words based on the respective score of each scored verb or noun. For example, scores above a certain threshold may qualify a word as a suggestive intent word, whereas scores below the threshold may qualify the word as a non-suggestive intent word.

The suggestive intent words and the non-suggestive intent words that are recognized by suggestive intent model 116 can then be expanded using an external database, such as Wordnet and/or Freebase. Wordnet can be used to obtain hypernyms of nouns that express suggestive intent. For example, a tomato can be expanded to be classified as a type of food using the Wordnet database, and a car can be classified as a type of vehicle. Freebase is a structured knowledgebase of places, people, and things by Google®, and can be used to find suggestive intent categories for nouns. For example, iPhone® can be classified as a phone or a communication device by Freebase, and a Macbook® Pro can be classified as a computer by Freebase.

In order to model the comparison between aspects for two or more related topics, the sentiment related to the aspects can be identified using a sentiment analysis tool, such as AlchemyAPI. This process is followed for an entire set of posts related to these related topics. The results are then sorted on the basis of the frequency of the occurrence, and the sentiment-aspect comparison is generated from the results.

Suggestive intent model 116 can then be built by passing the features indicative of suggestive intent to a machine-learning model to model social posts that have suggestive intent as opposed to posts that do not have suggestive intent. Examples of machine-learning models include "Random-Forest Classification" and "SVM-Linear Kernel Classification", to name just a few.

Example Procedures

The following discussion describes techniques for identifying social posts expressing suggestions towards a given topic (FIG. 6), comparing aspects of related topics (FIG. 7), and for building a suggestive intent model (FIG. 8) that may be implemented utilizing the systems and devices described herein. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
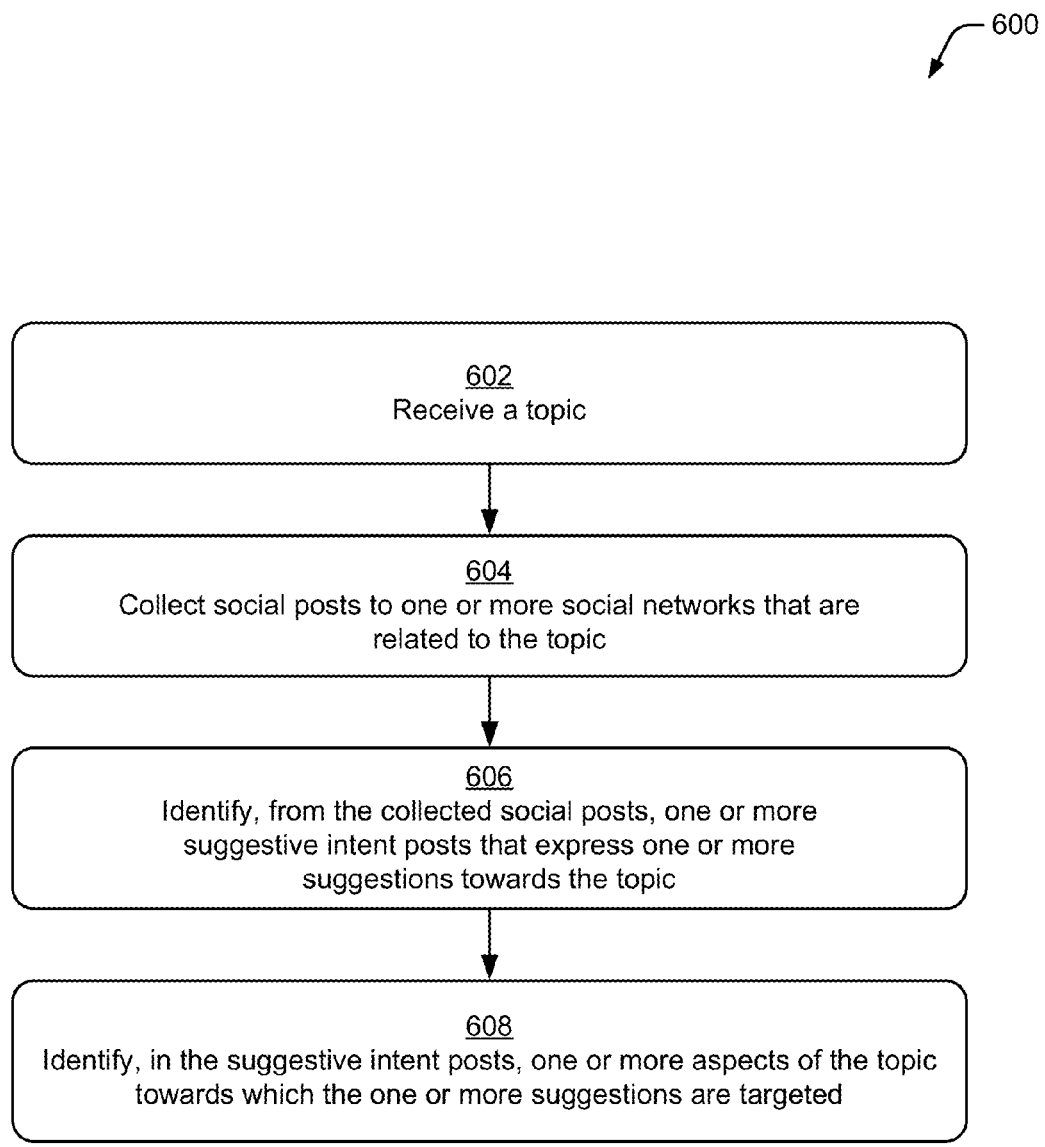
FIG. 6 illustrates a procedure in an example implementation in which a suggestive intent model is used to identify social posts expressing suggestive intent towards a given topic.

FIG. 6 illustrates a procedure 600 in an example implementation in which a suggestive intent model is used to identify social posts expressing suggestions towards a given topic.

At 602, a topic is received. For example, user interface 112 (FIG. 1) receives a topic 202 (FIG. 2) via topic control 302 (FIG. 3).

At 604, social posts to one or more social networks that are related to the topic are collected. For example, observation module 114 collects social posts 108 to one or more social networks 104 that are related to topic 202.

At 606, one or more suggestive intent posts that express one or more suggestions towards the topic are identified from the collected social posts. For example, suggestive intent model 116 identifies one or more suggestive intent posts 206 that express suggestions towards topic 202.

At 608, one or more aspects of the topic towards which the one or more suggestions are targeted are identified in the suggestive intent posts. For example, suggestive intent model 116 identifies, in the suggestive intent posts 206, one or more aspects 208 of topic 202 towards which the one or more suggestions are targeted.

Figure 7:
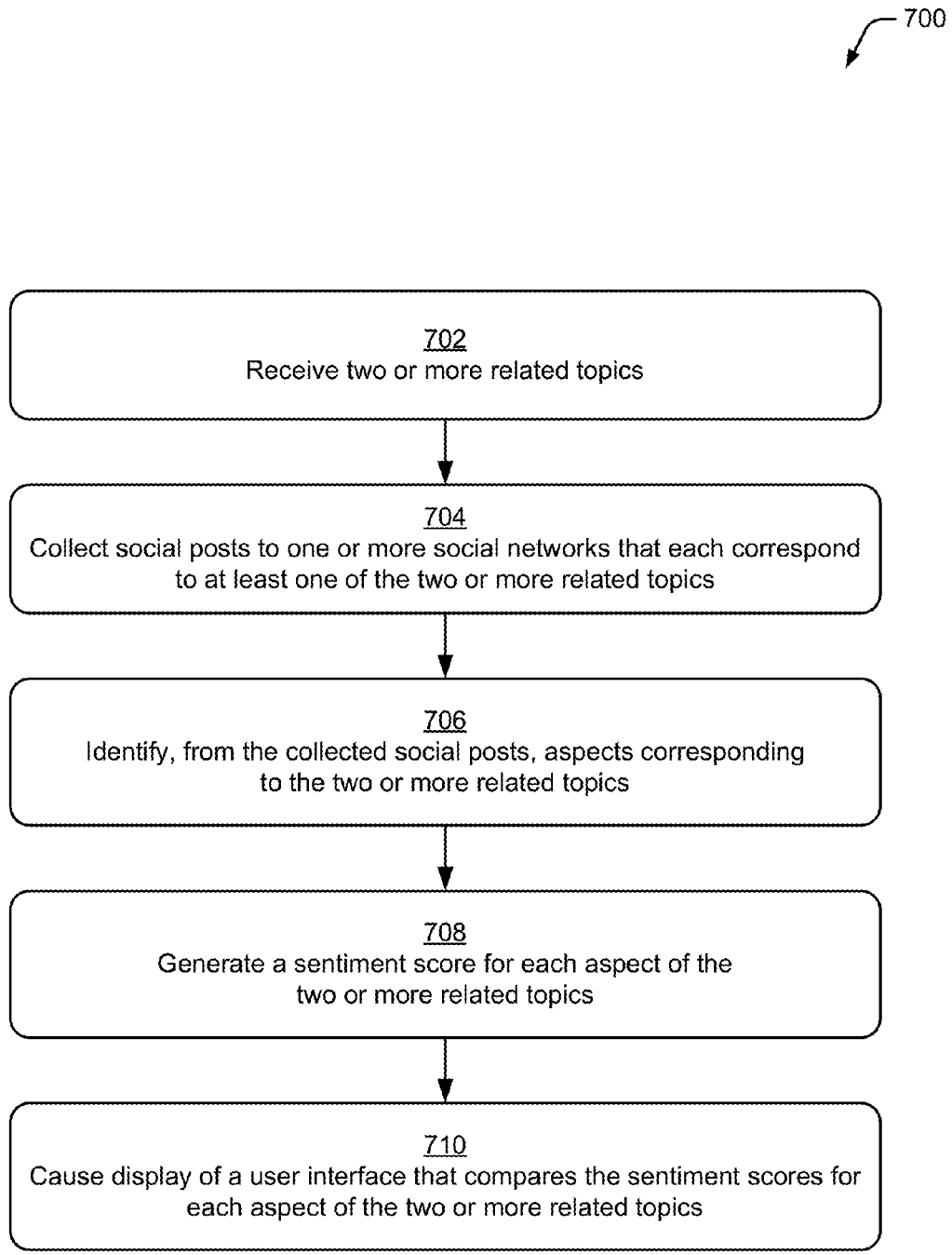
FIG. 7 illustrates a procedure in an example implementation in which a suggestive intent model is used to compare aspects of related topics.

FIG. 7 illustrates a procedure 700 in an example implementation in which a suggestive intent model is used to compare aspects of related topics.

At 702, two or more related topics are received. For example, user interface 112 (FIG. 1) receives two or more related topics 202 (FIG. 2) via topic control 302 (FIG. 3).

At 704, social posts to one or more social networks that each correspond to at least one of the two or more related topics are collected. For example, observation module 114 collects social posts 108 to one or more social networks 104 that are each related to each one of the two or more related topics 202.

At 706, aspects corresponding to the two or more related topics are identified from the collected social posts. For example, suggestive intent model 116 identifies aspects 208 corresponding to the two or more related topics 202 from the collected social posts 108.

At 708, a sentiment score for each aspect of each of the two or more related topics is generated. The sentiment score is based on words in the social posts that are indicative of positive sentiment and words in the social posts that are indicative of negative sentiment. At 710, a user interface that compares the sentiment scores for each aspect of the two or more related topics is displayed. For example, user interface 112 (FIG. 5) compares the sentiment scores for each aspect of each of the two or more related topics.

Figure 8:
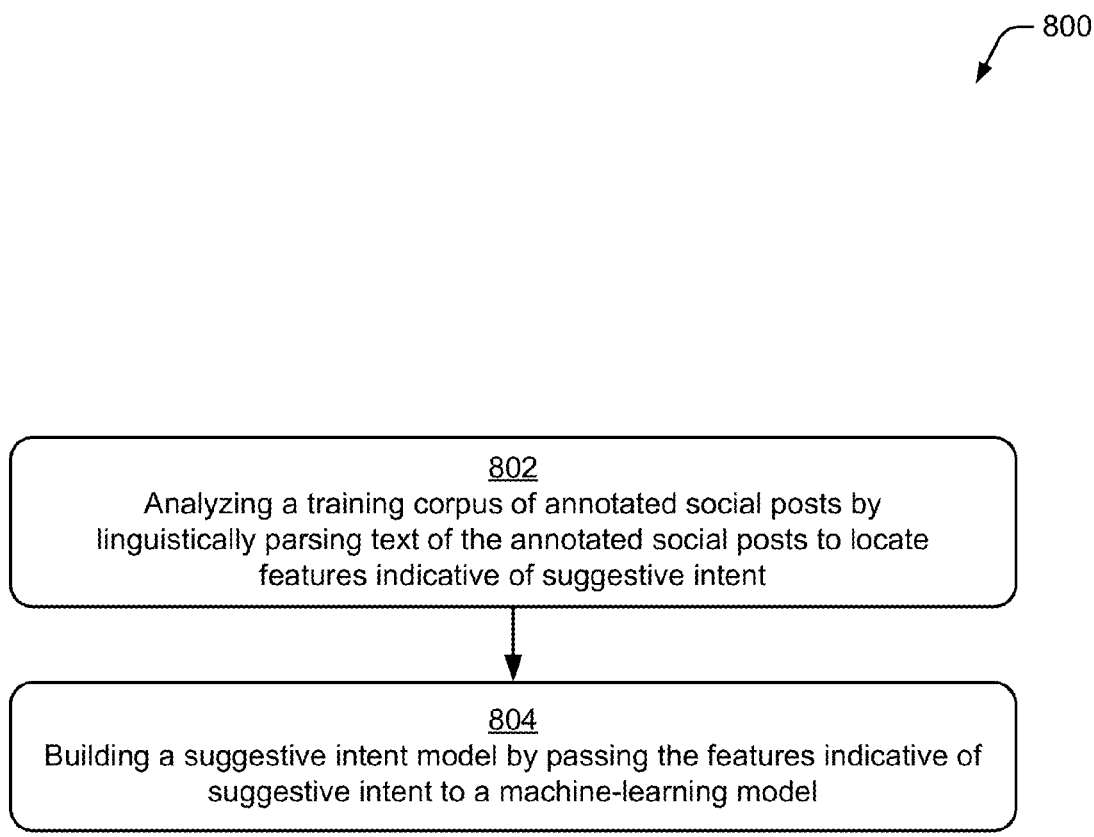
FIG. 8 illustrates a procedure in an example implementation in which a suggestive intent model is built.

FIG. 8 illustrates a procedure 800 in an example implementation in which a suggestive intent model is built.

At 802, a training corpus of annotated social posts is analyzed by linguistically parsing text of the social posts to locate features indicative of suggestive intent. Any standard machinery can be used for the linguistic parsing of the text. In one or more embodiments, the features indicative of suggestive intent include aspects related to a given topic, implicit aspects related to the given topic, wish or hope words or phrases, opinion words or phrases, negative opinion words or phrases, comparative words or phrases, sentiment words or phrases, and/or "bag-of-words" based TF-IDF vectors.

At 804, a suggestive intent model is built by passing the features indicative of suggestive intent to a machine-learning model. Examples of machine-learning models include "Random-Forest Classification" and "SVM-Linear Kernel Classification", to name just a few.

Having described example procedures in accordance with one or more implementations, consider now an example system and device that can be utilized to implement the various techniques described herein.

Example System and Device

FIG. 9 illustrates an example system generally at 900 that includes an example computing device 902 that is representative of one or more computing systems and/or devices that may implement the various techniques described herein. This is illustrated through inclusion of suggestive intent module 110, which operates as described above. The computing device 902 may be, for example, a server of a service provider, a device associated with a client (e.g., a client device), an on-chip system, and/or any other suitable computing device or computing system.

The example computing device 902 is illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device implementation, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
   receiving a topic;
   collecting social posts to at least one social network that are related to the topic;
   identifying, from the collected social posts, at least one suggestive intent post by detecting at least one word indicative of suggestive intent in the suggestive intent posts, the suggestive intent posts expressing a suggestion towards the topic; and
   identifying, in the suggestive intent posts, at least one aspect of the topic towards which the suggestion is targeted.

2. The computer-implemented method of claim 1, wherein the at least one word indicative of suggestive intent include at least one wish or hope word or phrase.

3. The computer-implemented method of claim 1, wherein the at least one word indicative of suggestive intent include at least one opinion word or phrase.

4. The computer-implemented method of claim 1, wherein the at least one word indicative of suggestive intent include at least one comparative word or phrase.

5. The computer-implemented method of claim 1, wherein the identifying the at least one suggestive intent post further comprises computing a confidence level for each of the collected social posts based on the at least one word indicative of suggestive intent.

6. The computer-implemented of claim 5, where the identifying the at least one suggestive intent post further comprises identifying the at least one suggestive intent post based on the confidence level of the at least one suggestive intent post exceeding a confidence threshold.

7. The computer-implemented method of claim 1, further comprising causing display of representations of the at least one suggestive intent post in a user interface, wherein the representations include an identifier of the at least one aspect of the topic towards which the suggestion is targeted.

8. The computer-implemented method of claim 7, wherein the identifying and causing display is performed in real-time as the social posts are being posted to the at least one social network.

9. One or more computer-readable storage media comprising instructions stored thereon that, responsive to execution by a computing device, cause the computing device to perform operations comprising:
  receiving two or more related topics;
  collecting social posts to least one social network that each correspond to at least one of the two or more related topics;
  identifying, from the collected social posts, aspects corresponding to the two or more related topics;
  generating a sentiment score for each aspect of each of the two or more related topics, the sentiment score based on words in the social posts that are indicative of positive sentiment and words in the social posts that are indicative of negative sentiment; and
  causing display of a user interface that compares the sentiment scores for each aspect of the two or more related topics.

10. The one or more computer-readable storage media of claim 9, wherein the sentiment score for a particular aspect of a particular topic is computed as the sum of sentiment scores for each collected social post corresponding to the particular aspect of the particular topic.

11. The one or more computer-readable storage media of claim 9, wherein the two or more related topics include at least two related topics corresponding to a same company.

12. The one or more computer-readable storage media of claim 9, wherein the two or more related topics include a first related topic corresponding to a first company, and a second related topic corresponding to a second company, the first company different than the second company.

13. The one or more computer-readable storage media of claim 9, wherein the sentiment score for a particular aspect of a particular topic is computed as the sum of sentiment scores for each collected social post corresponding to the particular aspect of the particular topic.

14. The one or more computer-readable storage media of claim 9, wherein the sentiment score for a particular aspect of a particular topic is computed as the sum of sentiment scores for each collected social post corresponding to the particular aspect of the particular topic, divided by a total number of social posts corresponding to the particular aspect of the particular topic.

15. A computer-implemented method for building a suggestive intent model comprising:
  analyzing a training corpus of annotated social posts by linguistically parsing text of the annotated social posts to locate features indicative of suggestive intent; and
  building the suggestive intent model by passing the features indicative of suggestive intent to a machine-learning model.

16. The computer-implemented method of claim 15, wherein the features indicative of suggestive intent include at least one of: an aspect related to the topic, an implicit aspect related to the topic, a wish or hope word or phrase, an opinion word or phrase, a negative opinion word or phrase, a comparative word or phrase, a sentiment word or phrase, or a bag-of-words based delta-term frequency-inverse document frequency (TF-IDF) vector.

17. The computer-implemented method of claim 15, wherein the features indicative of suggestive intent include suggestive intent words and non-suggestive intent words.

18. The computer-implemented method of claim 17, wherein the suggestive intent words and the non-suggestive words are determined by:
  parsing the text of the annotated social posts to locate verbs and nouns; and
  scoring the located verbs and nouns based on a comparison of a number of times that the located verbs and nouns occur in annotated social posts expressing suggestive intent and a number of times that the located verbs and nouns occur in annotated social posts not expressing suggestive intent.

19. The computer-implemented method of claim 17, further comprising expanding a number of suggestive intent words and non-suggestive intent words recognized by the suggestive intent model using an external database.

20. The computer-implemented method of claim 1, wherein the at least one word indicative of suggestive intent includes a wish or hope word or phrase, an opinion word or phrase, or a comparative word or phrase.

* * * * *